United States Patent
Sano

(10) Patent No.: US 6,540,635 B1
(45) Date of Patent: Apr. 1, 2003

(54) HYDRAULIC CONTROL SYSTEM OF AUTOMOTIVE AUTOMATIC TRANSMISSION

(75) Inventor: Takashi Sano, Shizuoka (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 09/592,252

(22) Filed: Jun. 12, 2000

(30) Foreign Application Priority Data

Jun. 29, 1999 (JP) .......................................... 11-183835

(51) Int. Cl.$^7$ ............................................... F16H 39/00
(52) U.S. Cl. ...................................... 475/120; 475/127
(58) Field of Search ................................ 475/116, 120, 475/122, 118, 127

(56) References Cited

U.S. PATENT DOCUMENTS

| | | | |
|---|---|---|---|
| 3,896,685 A | * 7/1975 | Shellman | 475/127 X |
| 5,251,509 A | * 10/1993 | Pollack et al. | 475/127 |
| 5,281,190 A | * 1/1994 | Koivunen | 475/116 |
| 5,749,802 A | * 5/1998 | Tanahashi et al. | 475/120 |
| 5,836,845 A | * 11/1998 | Sakaguchi et al. | 475/127 X |
| 6,139,459 A | * 10/2000 | Suzuki | 475/127 |

FOREIGN PATENT DOCUMENTS

| | | | |
|---|---|---|---|
| EP | 405596 | * 1/1991 | 475/120 |
| JP | 2-209665 | * 8/1990 | 475/120 |
| JP | 7-77274 | 3/1995 | |

* cited by examiner

Primary Examiner—Rodney H. Bonck
Assistant Examiner—Ha Ho
(74) Attorney, Agent, or Firm—Foley & Lardner

(57) ABSTRACT

An automatic transmission has a frictionally engaging element, such as a low-and-reverse brake or the like, that is hydraulically actuated for assuming a certain gear position. A hydraulic control system for the transmission comprises a first hydraulic section which produces a line pressure; a solenoid which produces a solenoid pressure; a decompression control valve which receives the line pressure to produce an output pressure while using both the solenoid pressure and the output pressure as signal pressures; a switching valve interposed between the decompression control valve and the frictionally engaging element. The switching valve has a first position wherein the output pressure is fed to the frictionally engaging element and a second position wherein the line pressure is fed to the frictionally engaging element. The hydraulic control system further comprises a second hydraulic section that keeps the switching valve at the first position when a signal pressure applied thereto is lower than a predetermined switching pressure and turns the switching valve to the second position when the signal pressure becomes higher than the predetermined switching pressure.

14 Claims, 8 Drawing Sheets

|  | L/C | H/C | R/C | 2-4/B | L&R/B |
|---|---|---|---|---|---|
| R-RANGE |  |  | ○ |  | ○ |
| 1 - GEAR | ○ |  |  |  | (○) |
| 2 - GEAR | ○ |  |  | ○ |  |
| 3 - GEAR | ○ | ○ |  |  |  |
| 4 - GEAR |  | ○ |  | ○ |  |

HYDRAULIC CONTROL SYSTEM OF AUTOMOTIVE AUTOMATIC TRANSMISSION

BACKGROUND OF THE INVENTION

1. Field of the Invention

The present invention relates to automotive automatic transmissions of an engaging pressure electronically controlled type (which will be referred to EPEC hereinafter for ease of description) wherein the hydraulic pressure needed by each frictionally engaging element is directly controlled by an electronic control means, and more particularly to a hydraulic control system of such type automotive automatic transmissions.

2. Description of the Prior Art

For simplifying a hydraulic control circuit, reducing the number of parts employed and reducing the size of a control valve body, the EPEC type automatic transmissions have been proposed and put into practically use particularly in the field of motor vehicles.

One of the hydraulic control systems of automatic transmissions of such type is shown in Japanese Patent First Provisional Publication 7-77274.

As is seen from FIG. 10A of accompanying drawings, the hydraulic control system of the publication comprises a frictionally engaging element which, upon gear change, is engaged or disengaged by an element engaging hydraulic pressure "Pc", a solenoid valve which produces a solenoid pressure "Psol" upon receiving a solenoid's output and a decompression control valve which produces or controls the element engaging hydraulic pressure "Pc" in accordance with the solenoid pressure "Psol" and the element engaging hydraulic pressure "Pc". For producing the pressure "Pc" which varies from 0 (zero) to the maximum (viz., a line pressure "PL"), the decompression control valve receives the line pressure "PL" while using both the pressures "Psol" and "Pc" as signal pressures.

However, as is seen from the characteristic line (solid line) of the graph of FIG. 10B, due to the inevitable construction, the hydraulic control system is forced to have a larger gain (viz., a larger rate of change of the pressure "Pc" to change of the pressure "Psol"), which tends to cause poor and unstable hydraulic controlling upon gear change.

One measure for eliminating such drawback is to lower the gain as is depicted by the characteristic line (viz., phantom line) of the graph. However, in this case, the element engaging pressure "Pc" fails to reach the level of the line pressure "PL" even when the solenoid pressure "Psol" shows the maximum level. Accordingly, in this case, it is impossible to obtain a sufficient torque capacity needed for assuredly keeping the engaged condition of the frictionally engaging element after completion of gear change, and thus when the engine torque becomes large, slippage of the frictionally engaging element tends to occur.

That is, in order to avoid or at least minimize the slippage of the frictionally engaging element even when a marked torque is applied thereto in accordance with the driving condition of the associated vehicle, it is necessary to set the element engaging pressure "Pc" at a higher level after completion of gear change. While, in order to reduce a shift shock at gear change, it is necessary to set the pressure "Pc" at a relatively lower level suitable for the gear change. Even in inconsistent with each other, these two necessities are essential for providing a hydraulic control system of the automatic transmission with a satisfied performance.

SUMMARY OF THE INVENTION

It is therefore an object of the present invention to provide a hydraulic control system of an automotive automatic transmission, which is constructed by embodying the above-mentioned two necessities.

That is, in accordance with the present invention, there is provided a hydraulic control system of an automotive automatic transmission, that brings about both a satisfied controllability for a frictionally engaging element at a transitional period of gear change and a satisfied torque capacity for assuredly keeping the engaged condition of the engaging element after completion of gear change.

In the present invention, there is further provided a hydraulic control system of an automotive automatic transmission, that exhibits a stable and fine controlling performance against disturbance.

According to the present invention, there is provided a hydraulic control system for controlling an automatic transmission having a frictionally engaging element that is hydraulically actuated for assuming a certain gear position. The hydraulic control system comprises a first hydraulic section which produces a line pressure; a solenoid which produces a solenoid pressure; a decompression control valve which receives the line pressure to produce an output pressure while using both the solenoid pressure and the output pressure as signal pressures; a switching valve interposed between the decompression control valve and the frictionally engaging element, the switching valve having a first position wherein the output pressure is fed to the frictionally engaging element and a second position wherein the line pressure is fed to the frictionally engaging element; and a second hydraulic section that keeps the switching valve at the first position when a signal pressure applied thereto is lower than a predetermined switching pressure and turns the switching valve to the second position when the signal pressure becomes higher than the predetermined switching pressure.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1A:
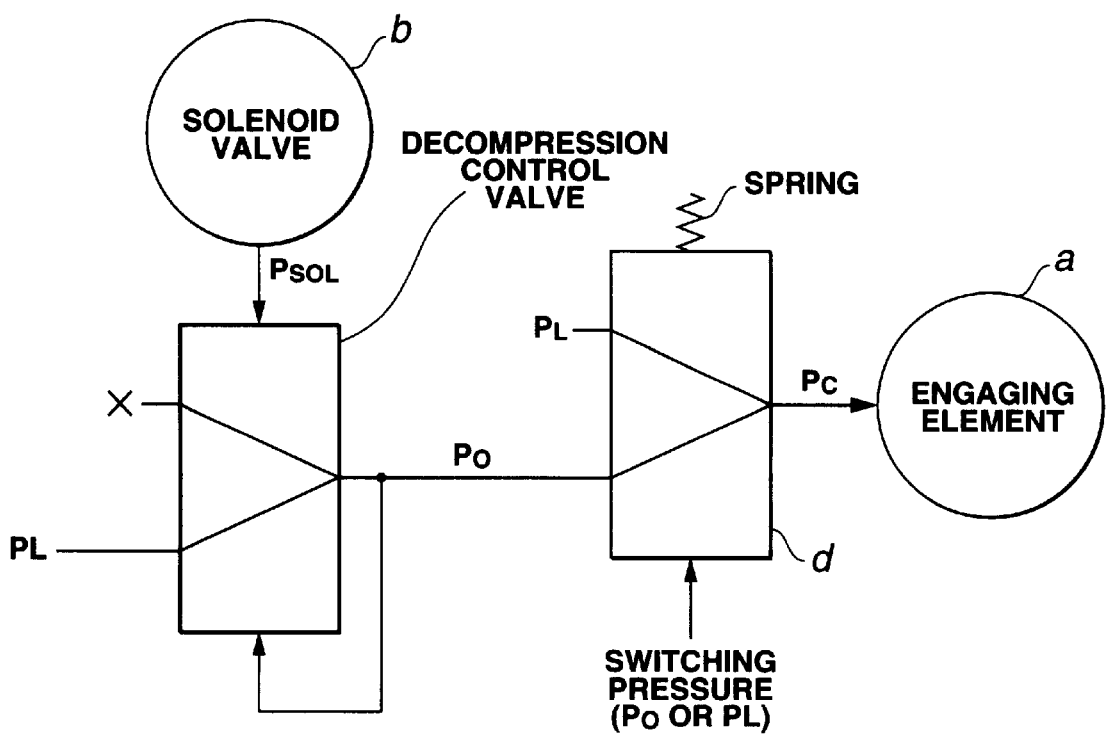
FIG. 1A is a schematic diagram of a hydraulic control system of an automatic transmission, according to the present invention.
Figure 1B:
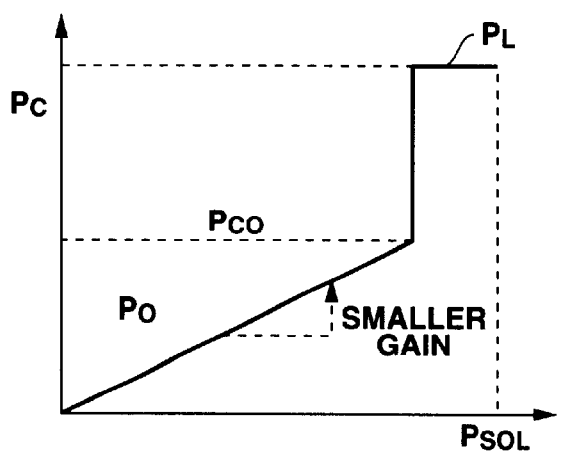
FIG. 1B is a graph showing a satisfied performance exhibited by the present invention.
Figures 2, 3:
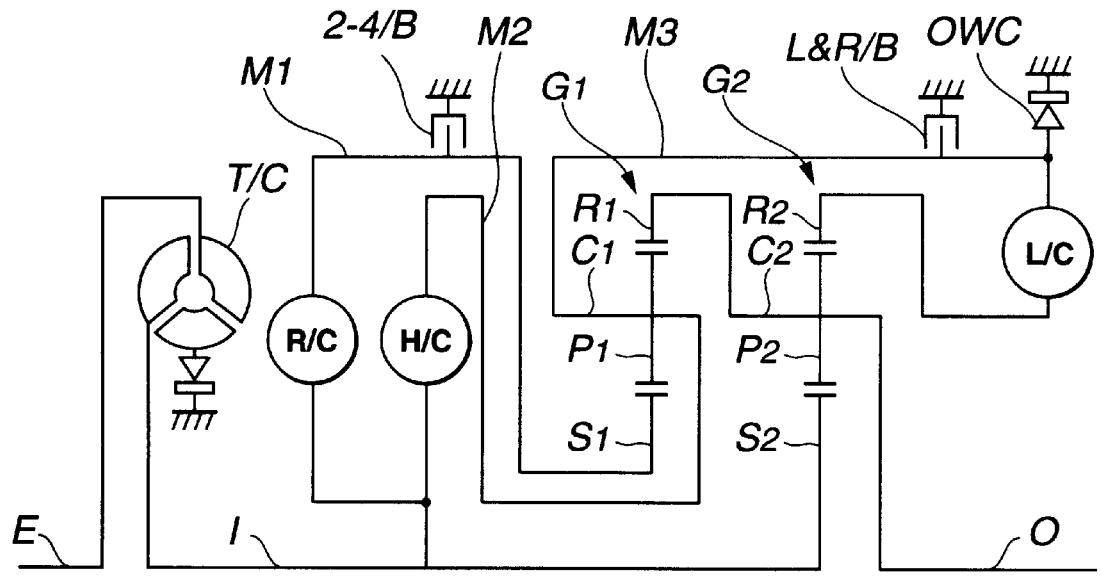
FIG. 2 is a schematic diagram of a gear train of an automatic transmission to which a hydraulic control system of a first embodiment of the present invention is practically applied.
FIG. 3 is a table showing ON/OFF condition of various engaging elements of the transmission with respect to Reverse-range and Drive-range, in the first embodiment.

Referring to FIG. 2, there is shown in a schematic manner a gear train of an automatic transmission to which a hydraulic control system of a first embodiment of the present invention is applied.

In the drawing, denoted by "E" is an output shaft of an engine, "I" is an input shaft of the transmission and "O" is an output shaft of the transmission.

Between the engine output shaft "E" and the transmission input shaft "I", there is disposed a torque converter "T/C", and between the input and output shafts "I" and "O" of the transmission, there are arranged first and second planetary gear units "G1" and "G2".

The first planetary gear unit "G1" is of a simple type unit that comprises first pinions "P1", a first carrier "C1", a first sun gear "S1" and a first ring gear "R1", and the second planetary gear unit "G2" is also of a simple type unit that comprises second pinions "P2", a second carrier "C2", a second sun gear "S2" and a second ring gear "R2".

The transmission input shaft "I" and the second sun gear "S2" are directly connected to each other to rotate together. To a member "M1" by which the transmission input shaft "I" and the first sun gear "S1" are connected, there is mounted a reverse clutch "R/C". A 2-4 brake "2-4/B" of multi-disc type is provided, by which the member "M1" is selectively connectable to a case of the transmission. To a member "M2" by which the transmission input shaft "I" and the first carrier "C1" are connected, there is mounted a high clutch "H/C". To a member "M3" by which the first carrier "C1" and the second ring gear "R2" are connected, there is mounted a low clutch "L/C". A low-and-reverse brake "L&R/B" of multi-disc type is provided, by which the member M3 is selectively connectable to the case of the transmission. A one-way clutch "OWC" is provided in parallel with the low-and-reverse brake "L&R/B". The first ring gear "R1" and the second carrier "C2" are directly connected to rotate together. The second carrier "C2" is connected to the transmission output shaft "O" to rotate together.

A table of FIG. 3 shows ON/OFF condition of the five engaging elements "L/C", "H/C", "R/C", "2-4/B" and "L&R/B" in case of Reverse range (R-range) and Drive range (D-range). Each circle in the table indicates ON (viz., engaged) condition of the corresponding engaging element, and the circle parenthesized indicates that the ON condition of the corresponding engaging element (L&R/B) does not participate in power transmission.

As is seen from this table, under R-range, the reverse clutch "R/C" and the low-and-reverse brake "L&R/B" are each engaged (ON). Under first gear of D-range, the low clutch "L/C" is engaged. Under this first gear, the low-and-reverse brake "L&R/B" is also engaged. However, this engagement does not participate in power transmission as has been mentioned hereinabove. Under second gear of D-range, the low clutch "L/C" and the 2-4 brake "2-4/B" are each engaged (ON). Under third gear of D-range, the low clutch "L/C" and the high clutch "H/C" are each engaged (ON), and under fourth gear of D-range, the high clutch "H/C" and 2-4 brake "2-4/B" are each engaged. Although not shown in the table, under first gear of HOLD mode of low-range (L-range), the low clutch "L/C" and the low-and-reverse brake "L&R/B" are each engaged.

Figure 4:
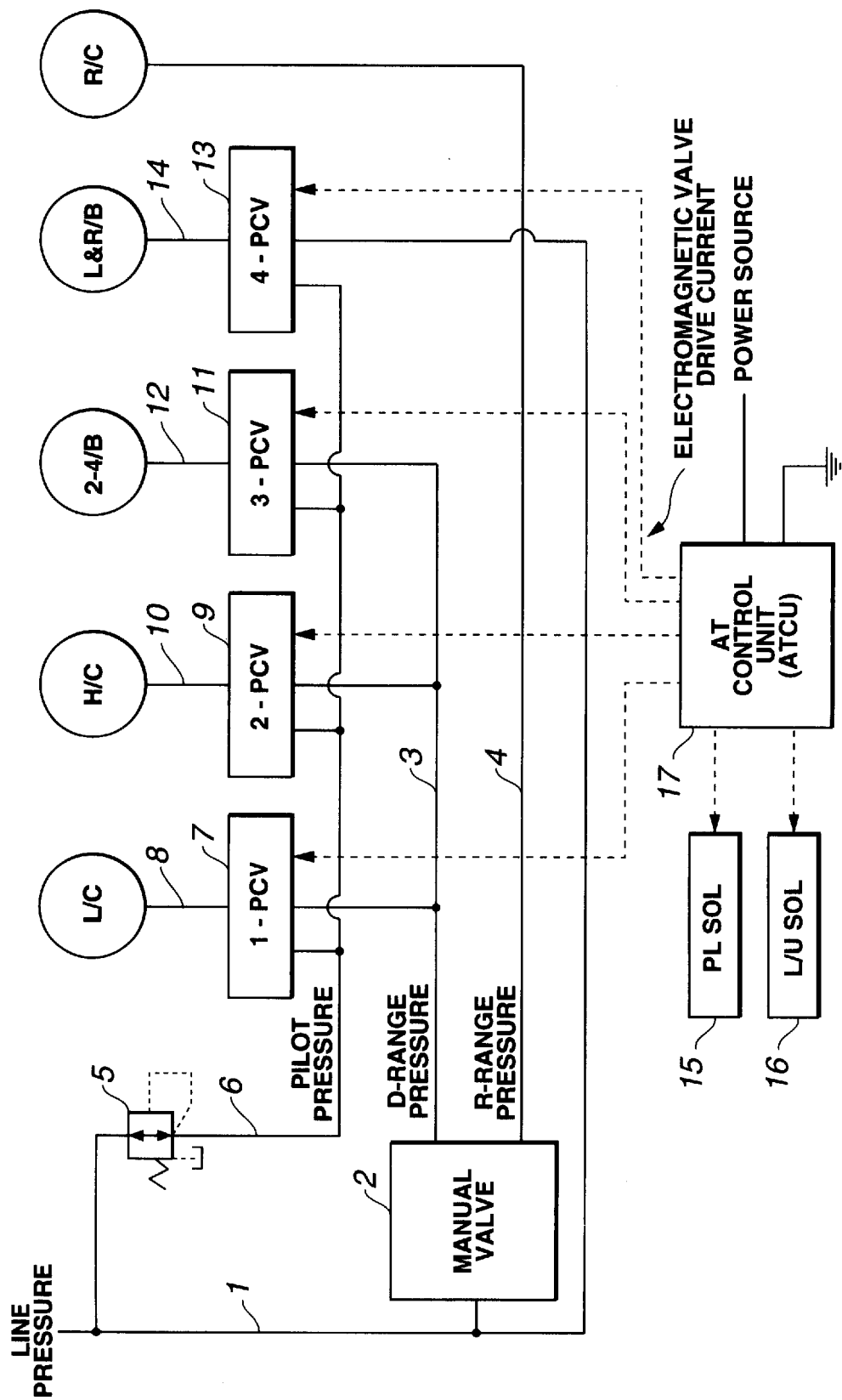
FIG. 4 is a block diagram of a hydraulic circuit of the transmission to which the hydraulic control system of the first embodiment is applied.

FIG. 4 shows schematically a hydraulic circuit of the automatic transmission to which the hydraulic control system of the first embodiment is practically applied.

Denoted by reference 1 is a line pressure passage, 2 is a manual valve, 3 is a D-range pressure passage and 4 is a R-range pressure passage. The manual valve 2 is actuated by a manual shift operation, so that upon selection of D-range, the line pressure passage 1 and the D-range pressure passage 3 are connected, and upon selection of R-range, the line pressure passage 1 and the R-range pressure passage 4 are connected.

Denoted by numeral 5 is a pilot valve, and 6 is a pilot pressure passage. The pilot valve 5 functions to reduce or control the line pressure from the line pressure passage 1 to a constant pilot pressure.

Denoted by numeral 7 is a first pressure control valve unit which, under control of the pilot pressure, produces a low clutch pressure from the D-range pressure, the lower clutch pressure being fed through a low clutch pressure passage 8 to the low clutch "L/C". The first pressure control valve unit 7 comprises a low clutch amp-valve and a low clutch solenoid 27 of duty control type (see FIG. 5).

Denoted by numeral 9 is a second pressure control valve unit which, under control of the pilot pressure, produces a high clutch pressure from the D-range pressure, the high clutch pressure being fed through a high clutch pressure passage 10 to the high clutch "H/C". The second pressure control valve unit 9 comprises a high clutch amp-valve and a high clutch solenoid 28 of duty control type (see FIG. 5).

Denoted by numeral 11 is a third pressure control valve unit, which, under control of the pilot pressure, produces a 2-4 brake pressure from the D-range pressure, the 2-4 brake pressure being fed through a 2-4 brake pressure passage 12 to the 2-4 brake "2-4/B". The third pressure control valve unit 11 comprises a 2-4 brake amp-valve and a 2-4 brake solenoid 29 of duty control type (see FIG. 5).

Denoted by numeral 13 is a fourth pressure control valve unit which, under control of the pilot pressure, produces a low-and-reverse brake pressure from the line pressure, the low-and-reverse brake pressure being fed through a low-and-reverse brake pressure-passage 14 to-the low-and-reverse brake "L&R/B". The fourth pressure control valve unit 13 comprises a low-and-reverse brake amp-valve 32 (see FIG. 6), a reverse stall valve 33 (see FIG. 6) and a low-and-reverse brake solenoid valve 30 (see FIGS. 5 and 6).

In the drawing of FIG. 4, denoted by numeral 15 is a pressure control solenoid of ON/OFF type, which changes the line pressure to higher and lower levels.

Denoted by numeral 16 is a lock-up solenoid of duty type, which controls ON/OFF operation of a lock-up clutch.

Denoted by numeral 17 is an automatic transmission control unit "ATCU" including a microprocessor, which, based on various information signals applied thereto, carries out various arithmetical operations including those of gear change control. In accordance with the result of the operations, the control unit 17 outputs solenoid drive current to each of the solenoids 15, 16, 27, 28, 29 and 30. As is known, the microprocessor generally comprises a central processing unit (CPU), a random access memory (RAM), a read only memory (ROM) and input and output interfaces.

Figure 5:
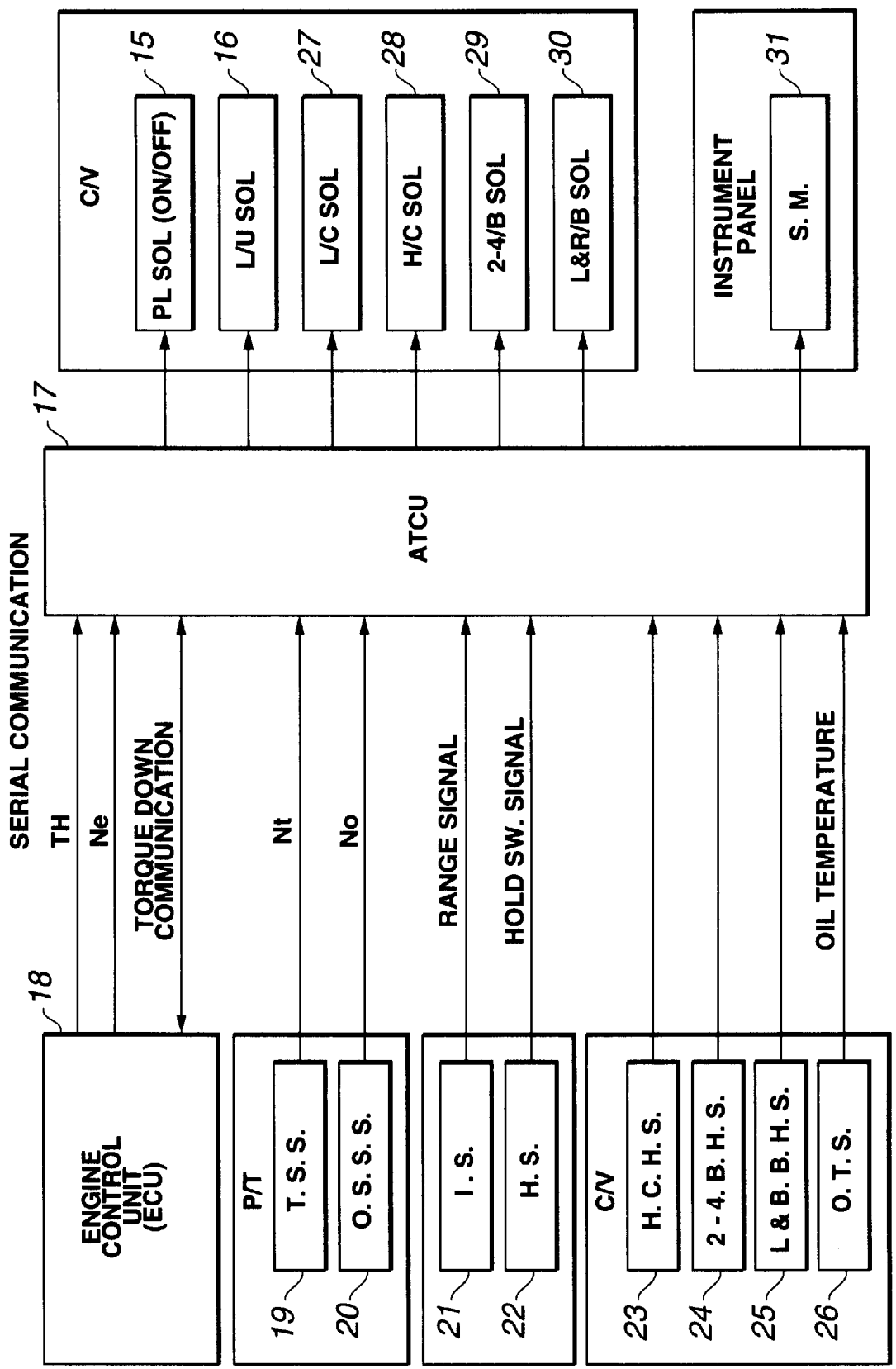
FIG. 5 is a block diagram of an electronic control system employed in the hydraulic control system of the first embodiment.

FIG. 5 shows an electronic control system employed in the hydraulic control system of the first embodiment. Denoted by numeral 18 is an engine control unit "ECU" which feeds by means of serial communication the automatic transmission control unit 17 with an information signal representing a throttle opening degree "TH" and an information signal representing an engine speed "Ne". Between these two control units 17 and 18, a so-called torque down communication is carried out.

In the power train "PT" of the transmission, there are installed a turbine speed sensor 19 and an output shaft speed sensor 20, which feed the control unit 17 with an information signal representing a turbine speed "Nt" of the torque converter "T/C" and an information signal representing a rotation speed "No" of the output shaft "O". From an inhibitor switch 21 and a hold switch 22, there are inputted into the control unit 17 a range signal and a hold switch signal respectively.

In a control valve unit "C/V" of the transmission, there are installed a high clutch hydraulic switch 23, a 2-4 brake hydraulic switch 24 and a low-and-reverse brake switch 25, which feed the control unit 17 with switch signals representing a pressure supply condition of the high clutch "H/C", that of the 2-4 brake "2-4/B" and that of the low-and-reverse brake "L&R/B". From an oil temperature sensor 26, there is inputted into the control unit 17 an information signal representing an oil temperature of the transmission.

By processing the information signals applied thereto, the automatic transmission control unit 17 issues instruction signals, viz., solenoid drive current, to each of the pressure control solenoid 15, the lock-up solenoid 16, the low clutch solenoid 27, the high clutch solenoid 28, the 2-4 brake solenoid 29 and the low-and-reverse brake solenoid 30 (valve) which are also installed in the control valve unit "C/V". The control unit 17 issues a vehicle speed representing signal to a speed meter 31 mounted on an instrument panel.

Figure 6:
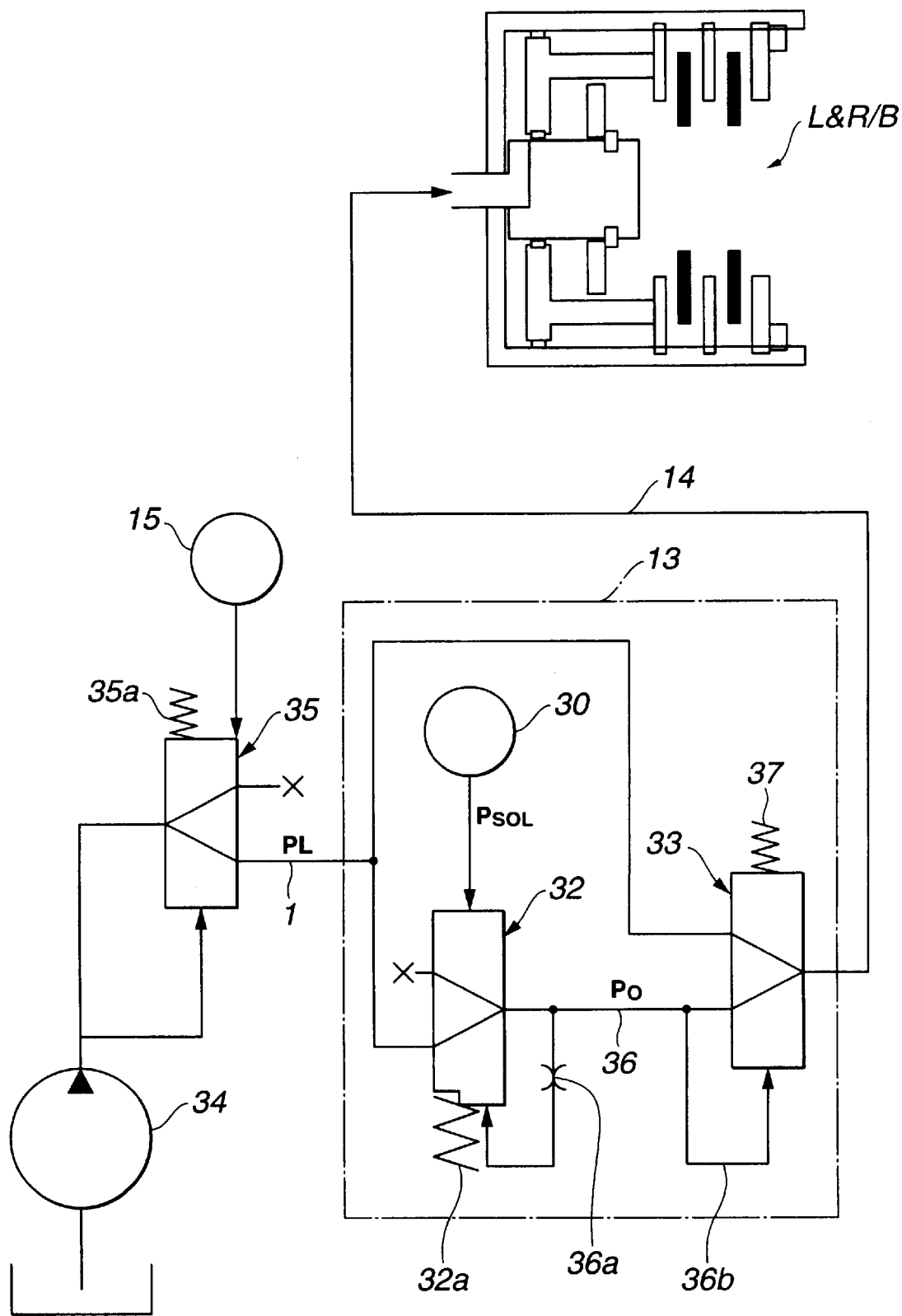
FIG. 6 is a hydraulic circuit for a low-and-reverse brake, to which the hydraulic control system of the first embodiment is applied.

FIG. 6 shows the detail of the hydraulic circuit for the low-and-reverse brake "L&R/B", to which the hydraulic control system of the first embodiment of the invention is practically applied.

As has been mentioned in the section of FIG. 4, the fourth pressure control valve unit 13 is connected through the low-and-reverse brake pressure passage 14 to the low-and-reverse brake "L&R/B". The line pressure passage 1 is connected to the fourth pressure control valve unit 13 to feed the same with the line pressure. For producing the line pressure of higher and lower levels, the pressure control solenoid 15 actuates in an ON/OFF manner a pressure regulator valve 35 through which a hydraulic fluid pumped out by an oil pump 34 is led to the fourth pressure control valve unit 13. As shown, a spool of the pressure regulator valve 35 is biased in one direction by a spring 35a, and biased in the other direction by the pressure produced by the oil pump 34.

A solenoid pressure from the low-and-reverse brake solenoid valve 30 actuates the low-and-reverse brake amp-valve 32 which is a decompression control valve.

As shown, a spool of the valve 32 is biased by a spring 32a against the solenoid pressure from the solenoid valve 30, and a pressure produced by the valve 32 is fed back through an orifice 36a to the spool to bias the same in a direction against the solenoid valve 30.

The reverse stall valve 33 is a switching valve as will become apparent as the description proceeds.

Between the low-and-reverse brake amp-valve 32 and the reverse stall valve 33, there extends an output pressure passage 36. A spool of the reverse stall valve 33 is biased in a direction by a spring 37 and the pressure "Po" in the output pressure passage 36 is applied to the spool in a direction against the spring 37. The low-and-reverse pressure passage 14 extends from the reverse stall valve 33 to the low-and-reverse brake "L&R/B".

In the first embodiment, the following measures are employed.

The reverse stall valve 33 is so constructed and arranged as to carry out the following operation. That is, when the output pressure "Po" from the low-and-reverse amp-valve 32 is under a predetermined switching pressure "Pco", the valve 33 takes a first position to feed the output pressure "Po" of the valve 32 to the low-and-reverse brake "L&R/B", while, when the output pressure "Po" from the valve 32 exceeds the predetermined switching pressure "Pco", the valve 33 switches to take a second position to feed the line pressure "PL" to the low-and-reverse brake "L&R/B".

Figure 10A:
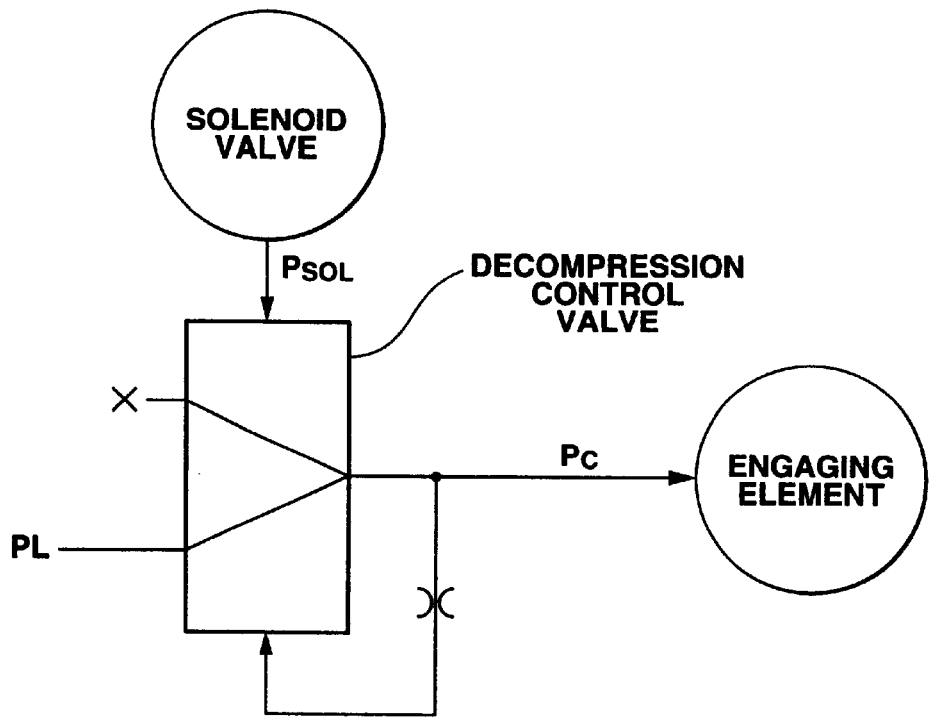
FIG. 10A is a schematic diagram of a conventional hydraulic control system of an automatic transmission.
Figure 10B:
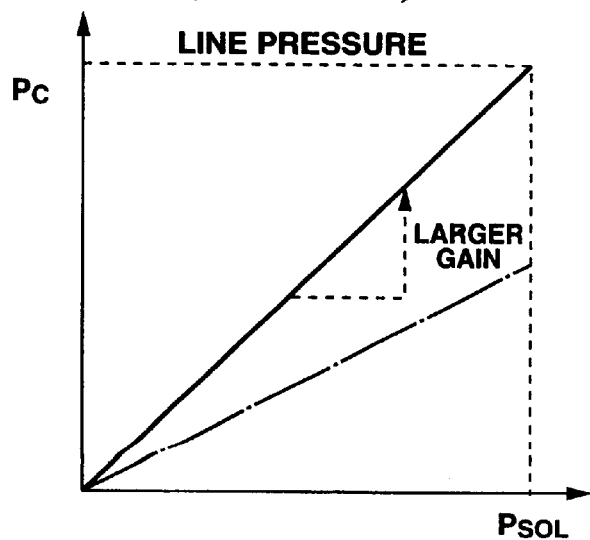
FIG. 10B is a graph showing a performance exhibited by the conventional hydraulic control system.

In addition to the above, the low-and-reverse amp-valve 32 is constructed and arranged to have a gain (viz., the rate of change of the output pressure "Po" of the valve 32 to change of the solenoid pressure "Psol") that is smaller than a gain that would be set by a corresponding decompression control valve which directly controls the element engaging pressure like in the manner as shown in FIG. 10A.

In the illustrated embodiment, the solenoid pressure "Psol" of the low-and-reverse brake solenoid valve 30 is applied to one end of the spool of the low-and-reverse brake amp-valve 32, and the output pressure "Po" from the valve 32 is applied to the other end of the spool. For reducing the gain of the valve 32, the spool thereof has a smaller pressure receiving area to the output pressure "Po".

The predetermined switching pressure "Pco" is a maximum pressure that is actually needed at a transitional period of gear change for bringing about engagement and/or releasement of the low-and-reverse brake "L&R/B".

As has been mentioned hereinabove, the spool of the reverse stall valve 33 is biased in one direction (viz., downward in FIG. 6) by the spring 37, and biased in the other direction (viz., upward in FIG. 6) by the output pressure "Po" from the low-and-reverse brake amp-valve 32. Thus, when the biasing force of the output pressure "Po" from the valve 32 overcomes the force of the spring 37, the reverse stall valve 33 takes the second position to feed the line pressure "PL" to the low-and-reverse brake "L&R/B".

Upon OFF of the pressure control solenoid 15, a solenoid pressure is applied to one end of the spool of the pressure regulator valve 35, and the pressure produced by the oil pump 34 is applied to the other end of the spool. Thus, when the pressure control solenoid 15 assumes ON condition, the pressure regulator valve 35 operates to produce a lower-level line pressure "PL", while when the pressure control solenoid 15 assumes OFF condition, the pressure regulator valve 35 operates to produce a higher-level line pressure "PL".

Figure 7:
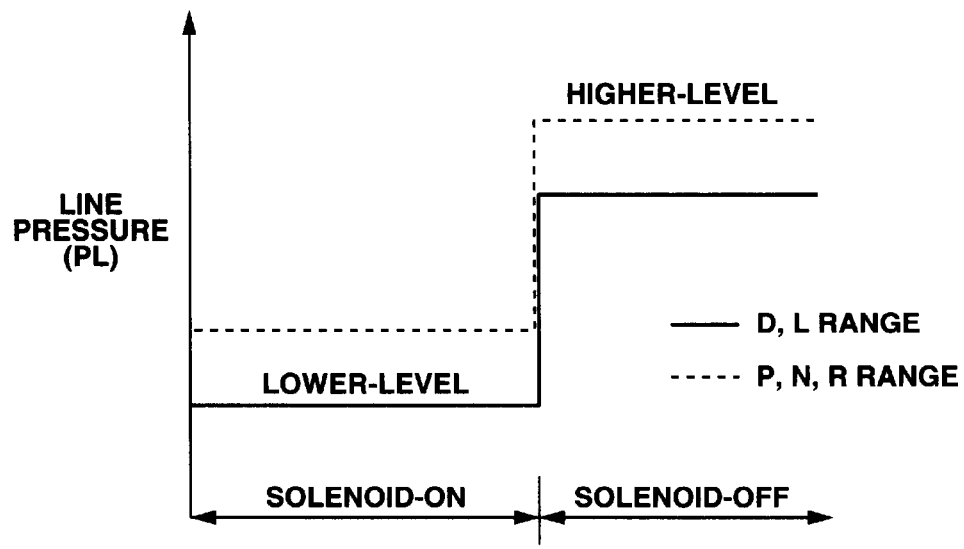
FIG. 7 is a graph showing the characteristic of line pressure employed in the hydraulic control system of the first embodiment.

As is shown in the graph of FIG. 7, production of the higher-level or lower-level line pressure "PL" is controlled in accordance with a line pressure switching map previously stored the ROM of the control unit 17. As shown, in D-range and low-range, the line pressure "PL" takes the lower level, while, in P-range, N-range and R-range, the line pressure "PL" takes the higher level.

In the following, operation of the first embodiment applied to the low-and-reverse brake "L&R/B" will be described with reference to FIG. 6.

As has been mentioned hereinabove, when the output pressure "Po" from the low-and-reverse amp-valve (or decompression control valve) 32 is lower than the predetermined switching pressure "Pco", the reverse stall valve (or switching valve) 33 assumes the first position to feed the output pressure "Po" to the low-and-reverse brake "L&R/B", while when the outlet pressure "Po" becomes higher than the predetermined switching pressure "Po", the reverse stall valve 33 assumes the second position to directly feed the line pressure "PL" to the low-and-reverse brake "L&R/B".

Thus, under a condition wherein the output pressure "Po" from the low-and-reverse brake amp-valve 32 has a value ranging from 0 (zero) to the predetermined switching pressure "Pco", the low-and-reverse brake pressure "P-L&R/B" actually fed to the low-and-reverse brake "L&R/B" is controlled by the valve 32 having the reduced gain.

While, when the output pressure "Po" from the valve 32 becomes higher than the predetermined switching pressure "Pco", the pressure "P-L&R/B" actually fed to the low-and-reverse brake "L&R/B" instantly increases to the level of the line pressure "PL" due to switching of the reverse stall valve 33 to the second position.

Figure 8:
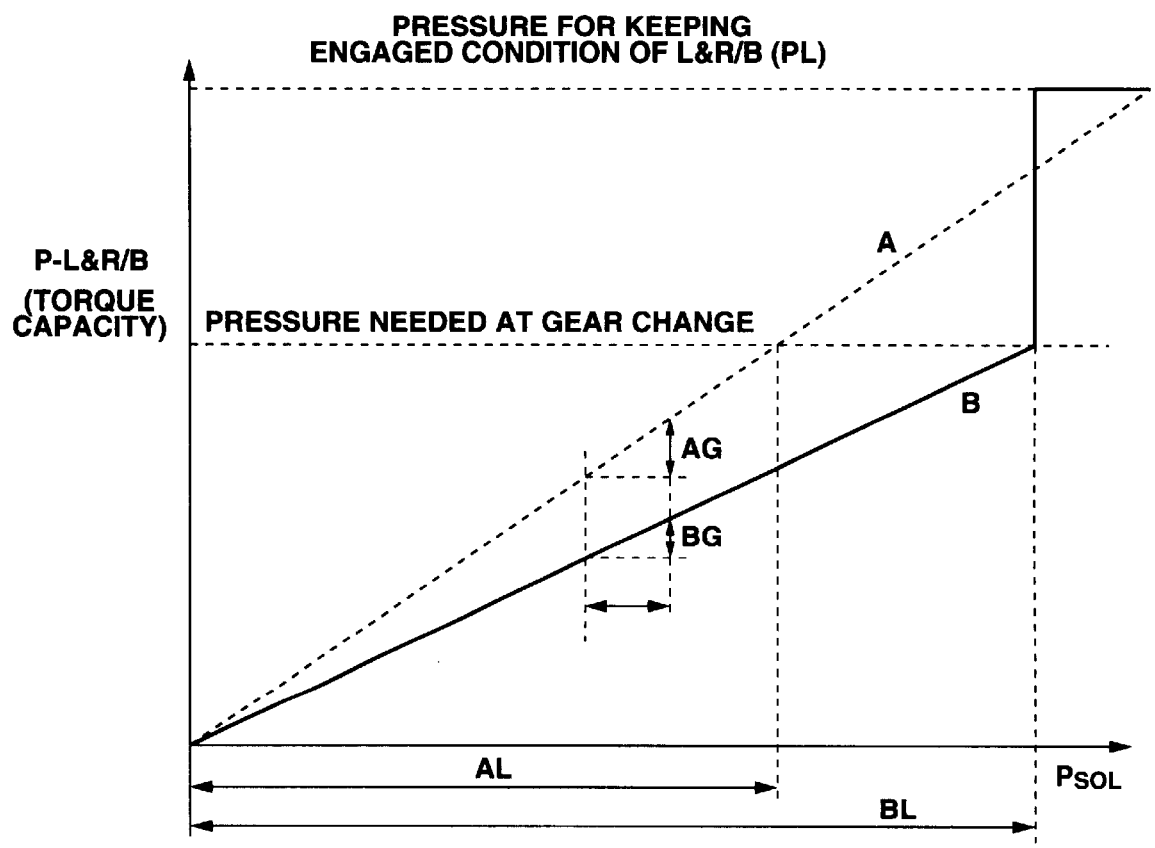
FIG. 8 is a graph showing both the characteristic line (viz., solid line) of a pressure applied to the low-and-reverse brake in the first embodiment of the present invention and the characteristic line (viz., broken line) of the corresponding pressure in a conventional hydraulic control system.

This will be well understood from the graph of FIG. 8. That is, as is indicated by a solid characteristic line "B", the pressure "P-L&R/B" actually fed to the low-and-reverse brake "L&R/B" has a characteristic that is a combination of the proportional characteristic induced by the output pressure "Po" under the reduced gain and the step-up characteristic induced by the line pressure "PL". For comparison, the characteristic of a conventional control system is shown by a broken characteristic line "A". As shown, to the same solenoid pressure change, the change "BG" in the low-and-reverse brake pressure "P-L&R/B" according to the present invention is smaller than the change "AG" according to the conventional control system. That is, "AG>BG" is established. Furthermore, the range "BL" of the solenoid pressure "Psol" used at the gear change in the present invention is longer than the range "AL" in the conventional control system. That is, "AL <BL" is established.

Accordingly, in the present invention, at the transitional period of gear change, due to the nature of the reduced gain possessed by the valve 32, the low-and-reverse brake "L&R/B" can receive the pressure "P-L&R/B" (viz., the pressure "Po") that is stable and finely controlled, and after completion of the gear change, due to introduction of the line pressure "PL", the low-and-reverse brake "L&R/B" can assuredly keep the engaged condition of the same.

In the following, advantages of the first embodiment of the present invention will be described.

As has be described hereinabove, in the first embodiment, there is provided the reverse stall valve (or switching valve) 33. When, due to function of this valve 33, the output pressure "Po" from the low-and-reverse brake amp-valve (or decompression control valve) 32 is below the predetermined switching pressure "Pco", the output pressure "Po" is used as the pressure "P-L&R/B" actually fed to the low-and-reverse brake "L&R/B", and when the output pressure "Po" becomes above the switching pressure "Pco", the line pressure "PL" is used as the pressure "P-L&R/B". Furthermore, the gain of the low-and-reverse amp-valve 32 is set smaller than a gain that would be obtained by a decompression control valve which directly controls the element engaging pressure like in the manner as shown in FIG. 10A. Accordingly, at the transitional period of gear change, the stable and finely controlled pressure "Po" is used as the pressure "P-L&R/B" actually fed to the low-and-reverse brake "L&R/B", and after completion of the gear change, the line pressure "PL" is used as the pressure "P-L&R/B" for assuredly keeping the engaged condition of the brake "L&R/B".

As has been described hereinabove, the predetermined switching pressure "Pco" is a maximum pressure that is actually needed at the transitional period of gear change for establishing engagement and/or releasement of the low-and-reverse brake "L&R/B". Accordingly, any control for the low-and-reverse brake pressure "P-L&R/B" at the transitional period is carried out under the reduced gain of the low-and-reverse brake amp-valve 32. Thus, during the transitional period, the engaging action and/or releasing action of the low-and-reverse brake "L&R/B" is stably and finely controlled by the pressure "P-L&R/B".

The reverse stall valve 33 comprises basically a spool, a spring 37 that biases one end of the spool and a fluid passage 36b through which the output pressure "Po" from the low-and-reverse amp-valve 32 is applied to the other end of the spool. When the force produced in the fluid passage 36b becomes greater than the force of the spring 37, the reverse stall valve 33 switches to take the second position to feed the low-and-reverse brake "L&R/B" with the line pressure "PL". As shown, this switching is carried out without usage of an electromagnetic valve, and thus, reduction in number of parts is achieved and complicated valve control is not necessary.

Figure 9:
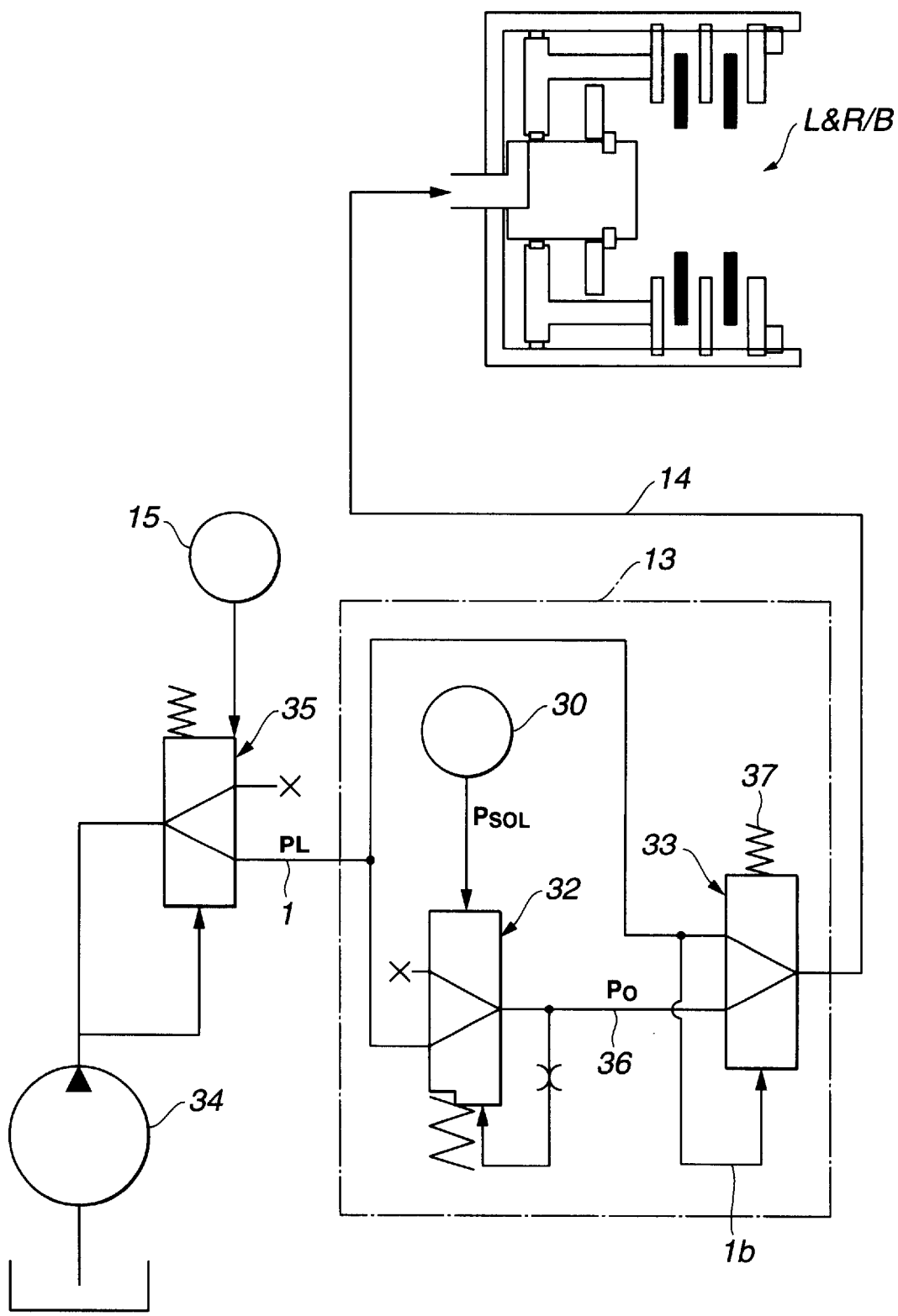
FIG. 9 is a view similar to FIG. 6, but showing a hydraulic control system of a second embodiment of the present invention.

Referring to FIG. 9, there is shown a hydraulic circuit for the low-and-reverse brake "L&R/B", to which the hydraulic control system of a second embodiment of the invention is applied.

Since the second embodiment is similar in arrangement to the above-mentioned first embodiment, detailed description of the second embodiment will be directed to only a portion that is different from that of the first embodiment.

As shown in the drawing, in the second embodiment, in place of the fluid passage 36b of the first embodiment, a fluid passage 1b is provided, which extends from the line pressure passage 1 to the other end of the spool of the reverse stall valve 33. That is, in this second embodiment, the switching of the line pressure "PL" from lower level to higher level, which takes place upon completion of gear change, is used for shifting the reverse stall valve 33 to the second position. That is, when the line pressure "PL" is at the lower level, the reverse stall valve 33 takes the first position to feed the output pressure "Po" to the low-and-reverse brake "L&R/B", while when the line pressure "PL" becomes to the higher level, the valve 33 switches to take the second position to feed the higher level line pressure "PL" to the brake "L&R/B".

Although the above-description is directed to an application of the invention to the low-and-reverse brake "L&R/B", the present invention is applicable to other frictionally engaging element, such as the low clutch "L/C", the high clutch "H/C", the 2-4 brake "2-4/B" or the like.

The entire contents of Japanese Patent Application P11-183835 (filed Jun. 29, 1999) are incorporated herein by reference.

Although the invention has been described above with reference to the two embodiments of the invention, the invention is not limited to the embodiments described above. Various modifications and variations of the embodiments described above will occur to those skilled in the art, in light of the above teachings.

What is claimed is:

1. In an automatic transmission having a frictionally engaging element that is hydraulically actuated for allowing the transmission to assume a certain gear position,
    a first solenoid valve that produces a first solenoid pressure for controlling a line pressure; and
    a hydraulic control system comprising:
        a first hydraulic pressure section that controls a hydraulic pressure from a hydraulic source and produces said line pressure in accordance with said first solenoid pressure;
        a second solenoid valve that produces a second solenoid pressure;
        a decompression control valve that produces an output pressure from said line pressure while using both said second solenoid pressure and said output pressure as signal pressures;
        a switching valve interposed between said decompression control valve and said frictionally engaging element, said switching valve having a first position wherein said output pressure is fed to said frictionally engaging element and a second position wherein the line pressure is fed to said frictionally engaging element; and
        a second hydraulic section that keeps said switching valve at said first position when a signal pressure applied thereto is lower than a predetermined switching pressure and turns said switching valve to said second position when said signal pressure becomes higher than said predetermined switching pressure.

2. A hydraulic control system as claimed in claim 1, in which a gain of said decompression control valve is set smaller than a predetermined value that is set when a pressure control to the output pressure is carried out by only said decompression control valve, said gain being a rate of change of said output pressure to change of said second solenoid pressure.

3. A hydraulic control system as claimed in claim 2, in which said second hydraulic section comprises:
    a biasing member that biases a spool of said switching valve in one direction; and
    a fluid line through which said output pressure acts on said spool to bias the same in the opposite direction,
    wherein when said output pressure is lower than the biasing force of said biasing member, said switching valve assumes said first position, and when said output pressure is higher than the biasing force of said biasing member, said switching valve assumes said second position.

4. A hydraulic control system as claimed in claim 2, in which said second hydraulic section comprises:
    a biasing member that biases a spool of said switching valve in one direction; and
    a fluid line through which the line pressure acts on said spool to bias the same in the opposite direction,
    wherein when said line pressure is lower than the biasing force of said biasing member, said switching valve assumes said first position, and when said line pressure is higher than the biasing force of said biasing member, said switching valve assumes said second position.

5. A hydraulic control system as claimed in claim 4, in which said first hydraulic section is constructed to selectively produce a lower level line pressure and a higher level line pressure.

6. A hydraulic control system as claimed in claim 5, in which when a gear change of the transmission is completed, the line pressure changes to assume the higher level.

7. A hydraulic control system as claimed in claim 1, in which said predetermined switching pressure is a maximum pressure that is actually needed at a transitional period of gear change for bringing about engagement and/or releasement of the frictionally engaging element.

8. A hydraulic control system as claimed in claim 1, in which said second hydraulic section comprises:
    a spring that biases a spool of said switching valve in one direction; and
    a fluid line through which either one of said output pressure and said line pressure acts on said spool to bias the same in the opposite direction,
    wherein when said one of said output pressure and said line pressure is lower than a predetermined level, said switching valve assumes said first position, and when said one is higher than said predetermined level, said switching valve assumes said second position.

9. A hydraulic control system as claimed in claim 1, in which said frictionally engaging element is at least one of a low-and-reverse brake, a low clutch, high clutch and a 2-4 brake of said transmission.

10. In an automatic transmission having a frictionally engaging element that is hydraulically actuated for assuming a certain gear position,
    a hydraulic control system comprising:
        a first hydraulic section which produces a line pressure;
        a solenoid valve which produces a solenoid pressure;
        a decompression control valve which receives the line pressure to produce an output pressure while using both said solenoid pressure and said output pressure as signal pressures;
        a switching valve interposed between said decompression control valve and said frictionally engaging element, said switching valve having a first position wherein said output pressure is fed to said frictionally engaging element and a second position wherein the line pressure is fed to said frictionally engaging element; and
        a second hydraulic section that keeps said switching valve at said first position when a signal pressure applied thereto is lower than a predetermined switching pressure and turns said switching valve to said second position when said signal pressure becomes higher than said predetermined switching pressure,
        wherein a gain of said decompression control valve is set smaller than a predetermined value that is set when a pressure control to the output pressure is carried out by only said decompression control valve, said gain being a rate of change of said output pressure to change of said solenoid pressure, and
        wherein said second hydraulic section comprises:
            a biasing member that biases a spool of said switching valve in one direction; and
            a fluid line through which the line pressure acts on said spool to bias the same in the opposite direction,
            wherein when said line pressure is lower than the biasing force of said biasing member, said switching valve assumes said first position, and when said line pressure is higher than the biasing force of said biasing member, said switching valve assumes said second position.

11. A hydraulic control system as claimed in claim 10, wherein said first hydraulic section is constructed to selectively produce a lower level line pressure and a higher level line pressure.

12. A hydraulic control system as claimed in claim 11, wherein when a gear change of the transmission is completed, the line pressure changes to assume the higher level.

13. In an automatic transmission having a frictionally engaging element that is hydraulically actuated for assuming a certain gear position, a hydraulic control system comprising:
 a first hydraulic section which produces a line pressure;
 a solenoid valve which produces a solenoid pressure;
 a decompression control valve which receives the line pressure to produce an output pressure while using both said solenoid pressure and said output pressure as signal pressures;
 a switching valve interposed between said decompression control valve and said frictionally engaging element, said switching valve having a first position wherein said output pressure is fed to said frictionally engaging element and a second position wherein the line pressure is fed to said frictionally engaging element; and
 a second hydraulic section that keeps said switching valve at said first position when a signal pressure applied thereto is lower than a predetermined switching pressure and turns said switching valve to said second position when said signal pressure becomes higher than said predetermined switching pressure,
 wherein said second hydraulic section comprises:
  a spring that biases a spool of said switching valve in one direction; and
  a fluid line through which either one of said output pressure and said line pressure acts on said spool to bias the same in the opposite direction,
  wherein when said one of said output pressure and said line pressure is lower than a predetermined level, said switching valve assumes said first position, and when said one is higher than said predetermined level, said switching valve assumes said second position.

14. In an automatic transmission having a frictionally engaging element that is hydraulically actuated for assuming a certain gear position, a hydraulic control system comprising:
 a first hydraulic section which produces a line pressure;
 a solenoid valve which produces a solenoid pressure;
 a decompression control valve which receives the line pressure to produce an output pressure while using both said solenoid pressure and said output pressure as signal pressures;
 a switching valve interposed between said decompression control valve and said frictionally engaging element, said switching valve having a first position wherein said output pressure is fed to said frictionally engaging element and a second position wherein the line pressure is fed to said frictionally engaging element; and
 a second hydraulic section that keeps said switching valve at said first position when a signal pressure applied thereto is lower than a predetermined switching pressure and turns said switching valve to said second position when said signal pressure becomes higher than said predetermined switching pressure,
 wherein a gain of said decompression control valve is set smaller than a predetermined value that is set when a pressure control to the output pressure is carried out by only said decompression control valve, said gain being a rate of change of said output pressure to change of said solenoid pressure.

* * * * *